United States Patent
Talty et al.

(10) Patent No.: US 10,404,293 B2
(45) Date of Patent: Sep. 3, 2019

(54) DYNAMIC FREQUENCY CORRECTION IN DELTA-SIGMA BASED SOFTWARE DEFINED RECEIVER

(71) Applicant: GM GLOBAL TECHNOLOGY OPERATIONS LLC, Detroit, MI (US)

(72) Inventors: Timothy J. Talty, Beverly Hills, MI (US); Cynthia D. Baringer, Malibu, CA (US); Mohiuddin Ahmed, Moorpark, CA (US); Jongchan Kang, Moorpark, CA (US); Yen-Cheng Kuan, Malibu, CA (US); James Chingwei Li, Simi Valley, CA (US); Emilio A. Sovero, Thousand Oaks, CA (US)

(73) Assignee: GM GLOBAL TECHNOLOGY OPERATIONS LLC, Detrodit, MI (US)

( * ) Notice: Subject to any disclaimer, the term of this patent is extended or adjusted under 35 U.S.C. 154(b) by 0 days.

(21) Appl. No.: 15/646,409

(22) Filed: Jul. 11, 2017

(65) Prior Publication Data
US 2018/0109273 A1 Apr. 19, 2018

Related U.S. Application Data

(62) Division of application No. 15/296,515, filed on Oct. 18, 2016.

(51) Int. Cl.
| | |
|---|---|
| H04B 1/10 | (2006.01) |
| H04B 1/00 | (2006.01) |
| H04L 27/26 | (2006.01) |
| H04B 7/0413 | (2017.01) |
| H04W 84/12 | (2009.01) |

(52) U.S. Cl.
CPC ........ *H04B 1/0042* (2013.01); *H04B 1/0039* (2013.01); *H04B 7/0413* (2013.01); *H04L 27/2601* (2013.01); *H04W 84/12* (2013.01)

(58) Field of Classification Search
CPC .......... H04L 25/03038; H04L 27/2647; H04B 17/00; H04B 17/21; G02F 1/0121; G02F 1/225
USPC ...... 375/350, 354, 219; 455/550, 552.1, 552
See application file for complete search history.

(56) References Cited

U.S. PATENT DOCUMENTS

| | | | | |
|---|---|---|---|---|
| 6,745,018 | B1* | 6/2004 | Zehavi | H04B 1/123 455/278.1 |
| 2006/0202775 | A1* | 9/2006 | Tsuzuki | H04B 3/04 333/17.1 |
| 2007/0298807 | A1* | 12/2007 | Yarkosky | H04W 16/12 455/450 |
| 2011/0009161 | A1* | 1/2011 | Trikha | H04B 1/1036 455/552.1 |
| 2011/0299576 | A1* | 12/2011 | Mikhemar | H04B 1/38 375/219 |
| 2016/0360530 | A1* | 12/2016 | Leyh | H04B 17/318 |

* cited by examiner

*Primary Examiner* — Khai Tran
(74) *Attorney, Agent, or Firm* — Lorenz & Kopf LLP (57) ABSTRACT

A method and apparatus for dynamically modifying filter characteristics of a Delta-Sigma modulator to accommodate for Doppler shift. A transceiver in a wireless cellular communication system for adapt to changes in the RF carrier frequency for maintaining signal integrity by applying a pilot tone in calibration to determine a frequency shift response for a bandpass filter. During operation, the system is operative to determine a Doppler shift and to shift the bandpass filter in response.

1 Claim, 6 Drawing Sheets

DYNAMIC FREQUENCY CORRECTION IN DELTA-SIGMA BASED SOFTWARE DEFINED RECEIVER

BACKGROUND OF THE INVENTION

Field of the Invention

This invention relates generally to wide bandwidth radio system designed to adapt to various global radio standards and, more particularly, to a cellular radio architecture that employs a combination of a single circulator, programmable band-pass sampling radio frequency (RF) front-end and optimized digital baseband that is capable of supporting all current cellular wireless access protocol frequency bands.

Discussion of the Related Art

Traditional cellular telephones employ different modes and bands of operation that have been supported in hardware by having multiple disparate radio front-end and baseband processing chips integrated into one platform, such as tri-band or quad-band user handsets supporting global system for mobile communications (GSM), general packet radio service (GPRS), etc. Known cellular receivers have integrated some of the antenna and baseband data paths, but nevertheless the current state of the art for mass mobile and vehicular radio deployment remains a multiple static channelizing approach. Such a static architecture is critically dependent on narrow-band filters, duplexers and standard-specific down-conversion to intermediate-frequency (IF) stages. The main disadvantage of this static, channelized approach is its inflexibility with regards to the changing standards and modes of operation. As the cellular communications industry has evolved from 2G, 3G, 4G and beyond, each new waveform and mode has required a redesign of the RF front-end of the receiver as well as expanding the baseband chip set capability, thus necessitating a new handset. For automotive applications, this inflexibility to support emerging uses is prohibitively expensive and a nuisance to the end-user.

Providing reliable automotive wireless access is challenging from an automobile manufacturers point of view because cellular connectivity methods and architectures vary across the globe. Further, the standards and technologies are ever changing and typically have an evolution cycle that is several times faster than the average service life of a vehicle. More particularly, current RF front-end architectures for vehicle radios are designed for specific RF frequency bands. Dedicated hardware tuned at the proper frequency needs to be installed on the radio platform for the particular frequency band that the radio is intended to operate at. Thus, if cellular providers change their particular frequency band, the particular vehicle that the previous band was tuned for, which may have a life of 15 to 20 years, may not operate efficiently at the new band. Hence, this requires automobile manufactures to maintain a myriad of radio platforms, components and suppliers to support each deployed standard, and to provide a path to upgradability as the cellular landscape changes, which is an expensive and complex proposition.

Known software-defined radio architectures have typically focused on seamless baseband operations to support multiple waveforms and have assumed similar down-conversion-to-baseband specifications. Similarly, for the transmitter side, parallel power amplifier chains for different frequency bands have typically been used for supporting different waveform standards. Thus, receiver front-end architectures have typically been straight forward direct sampling or one-stage mixing methods with modest performance specifications. In particular, no prior application has required a greater than 110 dB dynamic range with associated IP3 factor and power handling requirements precisely because such performance needs have not been realizable with complementary metal oxide semiconductor (CMOS) analog technologies. It has not been obvious how to achieve these metrics using existing architectures for CMOS devices, thus the dynamic range, sensitivity and multi-mode interleaving for both the multi-bit analog-to-digital converter (ADC) and the digital-to-analog converter (DAC) is a substantially more difficult problem.

Software-defined radio architectures do not currently exist in the automotive domain, but have been proposed and pursued in other non-automotive applications, such as military radios with multi-band waveforms. However, in those areas, because of vastly different waveform needs, conflicting operational security needs and complex interoperability requirements, a zero-IF approach has proven technically difficult. Known software defined radios have typically focused on backend processing, specifically providing seamless baseband operations to support multiple waveforms. The modest performance specifications haven't demanded anything more aggressive from front-end architectures. Straight-forward direct sampling or 1-stage mixing methods have been sufficient in the receiver. For software defined radios that employ delta-sigma modulators, the component function is commonly found after a down-conversion stage and has low-pass characteristics. With regard to the transmitter, parallel multiple power amplifier chains to support differing frequency bands and waveform standards have been sufficient for meeting the requirements.

Delta-sigma modulators are becoming more prevalent in digital receivers because, in addition to providing wideband high dynamic range operation, the modulators have many tunable parameters making them a good candidate for reconfigurable systems.

SUMMARY OF THE INVENTION

In accordance with an aspect of the present disclosure, an apparatus comprising an antenna operable to receive an RF signal, a memory for storing a configuration parameter, a software definable radio for configuring an initial filter response, filtering the RF signal to generate a filtered RF signal, and for reconfiguring the filter response in response to the configuration parameter, and a processor operable to process the filtered RF signal, determine a quality factor of the filtered RF signal, retrieve the configuration parameter in response to the quality factor, and to couple the configuration parameter to a software definable.

In accordance with a second aspect of the present disclosure, a method comprising, configuring a filter response having a first bandwidth and a first center frequency, filtering a pilot signal having a second center frequency, determining a frequency offset between the first center frequency and the second center frequency, generating a configuration parameter in response to the frequency offset, and storing the configuration parameter in a memory.

In accordance with a third aspect of the present disclosure, a method of configuring a software definable radio comprising retrieving a first configuration parameter, configuring a filter response in response to the first configuration parameter, filtering an RF signal, determining an offset between a center frequency of the RF signal and a center frequency of the filter response, retrieving a second configuration parameter associated with the offset, reconfiguring the filter response in response to the second configuration parameter, and filtering the RF signal.

In accordance with a fourth aspect of the present disclosure, a software definable radio comprising, a source of a pilot signal operable to generate a pilot signal at a first center frequency, a filter having a configurable filter response in response to a configuration parameter, a processor operative to generate a control signal in order to apply the pilot signal to the filter, for determining the first center frequency and for generating the configuration parameter in response to the first center frequency, and a memory for storing the configuration parameter in a memory.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a cellular radio architecture is merely exemplary in nature, and is in no way intended to limit the invention or its applications or uses. For example, the radio architecture of the invention is described as having application for a vehicle. However, as will be appreciated by those skilled in the art, the radio architecture may have applications other than automotive applications.

The cellular radio architectures discussed herein are applicable to more than cellular wireless technologies, for example, WiFi (IEEE 802.11) technologies. Further, the cellular radio architectures are presented as a fully duplexed wireless system, i.e., one that both transmits and receives. For wireless services that are receive only, such as global positioning system (GPS), global navigation satellite system (GNSS) and various entertainment radios, such as AM/FM, digital audio broadcasting (DAB), SiriusXM, etc., only the receiver design discussed herein would be required. Also, the described radio architecture design will enable one radio hardware design to function globally, accommodating various global wireless standards through software updates. It will also enable longer useful lifespan of the radio hardware design by enabling the radio to adapt to new wireless standards when they are deployed in the market. For example, 4G radio technology developments and frequency assignments are very dynamic. Thus, radio hardware deployed in the market may become obsolete after just one or two years. For applications, such as in the automotive domain, the lifespan can exceed ten years. This invention enables a fixed hardware platform to be updateable through software updates, thus extending the useful lifespan and global reuse of the hardware.

Figure 1:
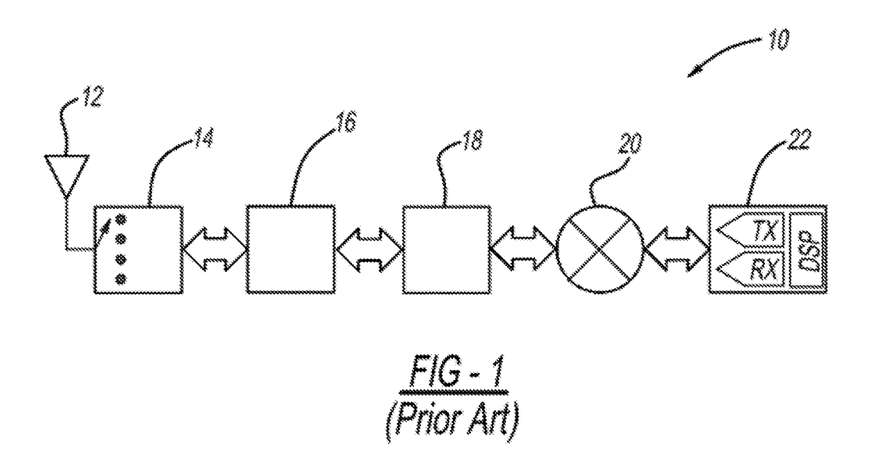
FIG. 1 shows a block diagram of a known multi-mode, multi-band cellular communications handset architecture.

FIG. 1 is a block diagram of a known multi-mode, multi-band cellular communications user handset architecture 10 for a typical cellular telephone. The architecture 10 includes an antenna structure 12 that receives and transmits RF signals at the frequency band of interest. The architecture 10 also includes a switch 14 at the very front-end of the architecture 10 that selects which particular channel the transmitted or received signal is currently for and directs the signal through a dedicated set of filters and duplexers represented by box 16 for the particular channel. Modules 18 provide multi-mode and multi-band analog modulation and demodulation of the receive and transmit signals and separates the signals into in-phase and quadrature-phase signals sent to or received from a transceiver 20. The transceiver 20 also converts analog receive signals to digital signals and digital transmit signals to analog signals. A baseband digital signal processor 22 provides the digital processing for the transmit or receive signals for the particular application.

Figure 2:
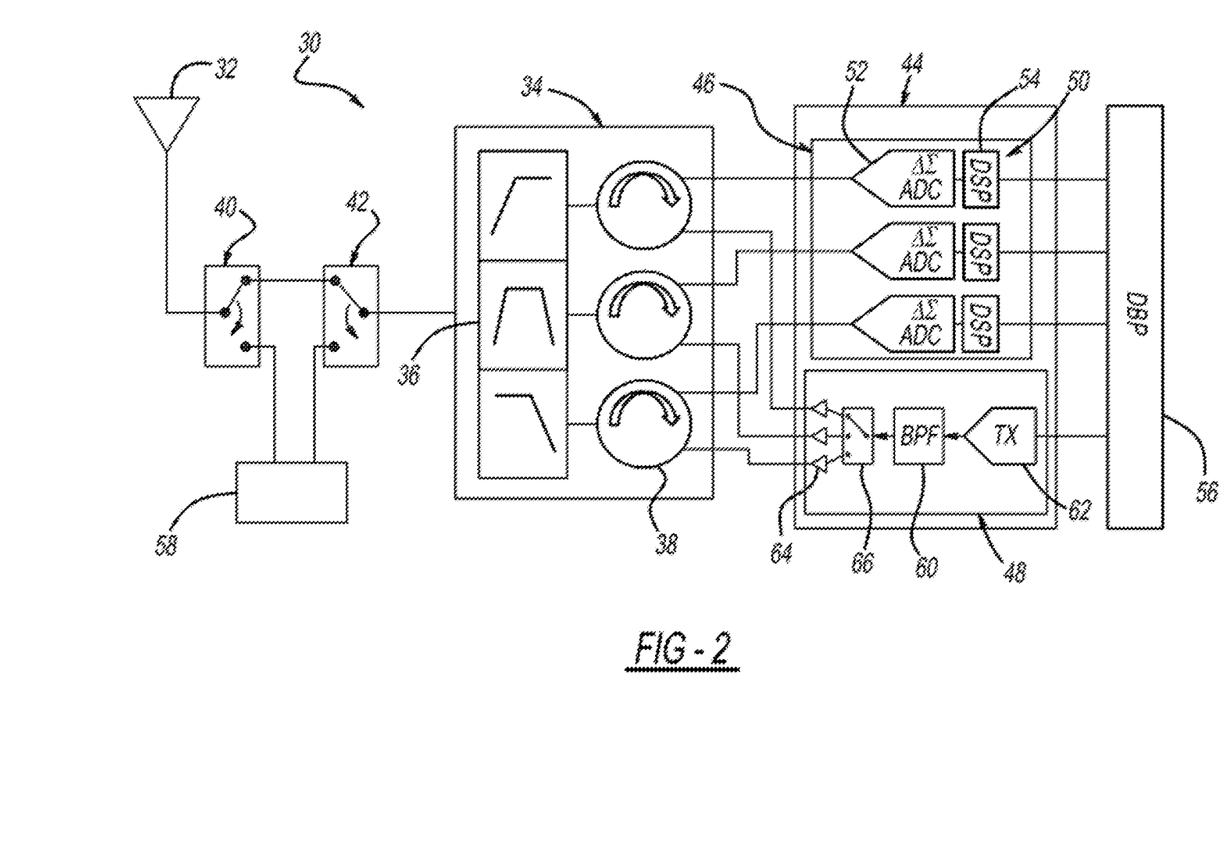
FIG. 2 shows is a schematic block diagram of a cellular radio front-end architecture that provides software programmable capabilities.

FIG. 2 is a schematic block diagram of a cellular radio front-end architecture 30 that provides software programmable capabilities as will be discussed in detail below. The architecture 30 includes an antenna structure 32 capable of receiving and transmitting the cellular frequency signals discussed herein, such as in a range of 400 MHz-3.6 GHz. Signals received and transmitted by the antenna structure 32 go through a multiplexer 34 that includes three signal paths, where each path is designed for a particular frequency band as determined by a frequency selective filter 36 in each path. In this embodiment, three signal paths have been selected, however, the architecture 30 could be expanded to any number of signal paths. Each signal path includes a circulator 38 that separates and directs the receive and transmit signals, and provides isolation so that the high power signals being transmitted do not enter the receiver side and saturate the receive signals at those frequency bands.

The architecture 30 also includes a front-end transceiver module 44 that is behind the multiplexer 34 and includes a receiver module 46 that processes the receive signals and a transmitter module 48 that processes the transmit signals. The receiver module 46 includes three receiver channels 50, one for each of the signal paths through the multiplexer 34, where a different one of the receiver channels 50 is connected to a different one of the circulators 38, as shown. Each of the receiver channels 50 includes a delta-sigma modulator 52 that receives the analog signal at the particular frequency band and generates a representative stream of digital data using an interleaving process in connection with a number of N-bit quantizer circuits operating at a very high clock rate, as will be discussed in detail below. As will further be discussed, the delta-sigma modulator 52 compares the difference between the receive signal and a feedback signal to generate an error signal that is representative of the digital data being received. The digital data bits are provided to a digital signal processor (DSP) 54 that extracts the digital data stream. A digital baseband processor (DBP) 56 receives and operates on the digital data stream for further signal processing in a manner well understood by those skilled in the art. The transmitter module 48 receives digital data to be transmitted from the processor 56. The module 48 includes a transmitter circuit 62 having a delta-sigma modulator that converts the digital data from the digital baseband processor 56 to an analog signal. The analog signal is filtered by a tunable bandpass filter (BPF) 60 to remove out of band emissions and sent to a switch 66 that directs the signal to a selected power amplifier 64 optimized for the transmitted signal frequency band. In this embodiment, three signal paths have been selected, however, the transmitter module 48 could be implemented using any number of signal paths. The amplified signal is sent to the particular circulator 38 in the multiplexer 34 depending on which frequency is being transmitted.

As will become apparent from the discussion below, the configuration of the architecture 30 provides software programmable capabilities through high performance delta-sigma modulators that provide optimized performance in the signal band of interest and that can be tuned across a broad range of carrier frequencies. The architecture 30 meets current cellular wireless access protocols across the 0.4-2.6 GHz frequency range by dividing the frequency range into three non-continuous bands. However, it is noted that other combinations of signal paths and bandwidth are of course possible. The multiplexer 34 implements frequency domain de-multiplexing by passing the RF carrier received at the antenna structure 32 into one of the three signal paths. Conversely, the transmit signal is multiplexed through the multiplexer 34 onto the antenna structure 32. For vehicular wireless access applications, such a low-cost integrated device is desirable to reduce parts cost, complexity, obsolescence and enable seamless deployment across the globe.

The delta-sigma modulators 52 may be positioned near the antenna structure 32 so as to directly convert the RF receive signals to bits in the receiver module 46 and bits to an RF signal in the transmitter module 48. The main benefit of using the delta-sigma modulators 52 in the receiver channels 50 is to allow a variable signal capture bandwidth and variable center frequency. This is possible because the architecture 30 enables software manipulation of the modulator filter coefficients to vary the signal bandwidth and tune the filter characteristics across the RF band, as will be discussed below.

The architecture 30 allows the ability to vary signal capture bandwidth, which can be exploited to enable the reception of continuous carrier aggregated waveforms without the need for additional hardware. Carrier aggregation is a technique by which the data bandwidths associated with multiple carriers for normally independent channels are combined for a single user to provide much greater data rates than a single carrier. Together with MIMO, this feature is a requirement in modern 4G standards and is enabled by the orthogonal frequency division multiplexing (OFDM) family of waveforms that allow efficient spectral usage.

The architecture 30 through the delta-sigma modulators 52 can handle the situation for precise carrier aggregation scenarios and band combinations through software tuning of the bandpass bandwidth, and thus enables a multi-segment capture capability. Dynamic range decreases for wider bandwidths where more noise is admitted into the sampling bandpass. However, it is assumed that the carrier aggregation typically makes sense when the user has a good signal-to-noise ratio, and not cell boundary edges when connectivity itself may be marginal. Note that the inter-band carrier aggregation is automatically handled by the architecture 30 since the multiplexer 34 feeds independent modulators in the channels 50.

The circulators 38 route the transmit signals from the transmitter module 48 to the antenna structure 32 and also provide isolation between the high power transmit signals and the receiver module 46. Although the circulators 38 provide significant signal isolation, there is some port-to-port leakage within the circulator 38 that provides a signal path between the transmitter module 48 and the receiver module 46. A second undesired signal path occurs due to reflections from the antenna structure 32, and possible other components in the transceiver. As a result, a portion of the transmit signal will be reflected from the antenna structure 32 due to a mismatch between the transmission line impedance and the antenna's input impedance. This reflected energy follows the same signal path as the incoming desired signal back to the receiver module 46.

The architecture 30 is also flexible to accommodate other wireless communications protocols. For example, a pair of switches 40 and 42 can be provided that are controlled by the DBP 56 to direct the receive and transmit signals through dedicated fixed RF devices 58, such as a global system for mobile communications (GSM) RF front-end module or a WiFi front-end module. In this embodiment, some select signal paths are implemented via conventional RF devices. FIG. 2 only shows one additional signal path, however, this concept can be expanded to any number of additional signal paths depending on use cases and services.

Delta-sigma modulators are a well known class of devices for implementing analog-to-digital conversion. The fundamental properties that are exploited are oversampling and error feedback (delta) that is accumulated (sigma) to convert the desired signal into a pulse modulated stream that can subsequently be filtered to read off the digital values, while effectively reducing the noise via shaping. The key limitation of known delta-sigma modulators is the quantization noise in the pulse conversion process. Delta-sigma converters require large oversampling ratios in order to produce a sufficient number of bit-stream pulses for a given input. In direct-conversion schemes, the sampling ratio is greater than four times the RF carrier frequency to simplify digital filtering. Thus, required multi-GHz sampling rates have limited the use of delta-sigma modulators in higher frequency applications. Another way to reduce noise has been to use higher order delta-sigma modulators. However, while first order canonical delta-sigma architectures are stable, higher orders can be unstable, especially given the tolerances at higher frequencies. For these reasons, state of the art higher order delta-sigma modulators have been limited to audio frequency ranges, i.e., time interleaved delta-sigma modulators, for use in audio applications or specialized interleaving at high frequencies.

The filter characteristics of a Delta-Sigma modulator may effectively be modified in order to compensate for Doppler shift. Doppler shift occurs when the transmitter of a signal is moving in relation to the receiver. The relative movement shifts the frequency of the signal, making it different at the receiver than at the transmitter. An exemplary system according to the present disclosure leverages the software-defined radio architecture to quickly estimate a shift in the carrier frequency and re-center the filter before the signal is disrupted or degraded. In normal operation, the notch of the modulator filter is centered about the expected carrier frequency of the received signal with the signal band information centered around the carrier frequency and not exceeding the bandwidth of the modulator filter. A Doppler shift would offset the carrier by an amount $\Delta f$ causing potential degradation to signal content with an increase in noise at one side of the band. According to the method and system described herein, the transceiver in a wireless cellular communication system can adapt to changes in the RF carrier frequency and may maintain signal integrity, by shifting the filter notch by the same amount as the carrier frequency.

For the cellular application discussed herein that covers multiple assigned frequency bands, a transmitter with multi-mode and multi-band coverage is required. Also, many current applications mandate transmitters that rapidly switch between frequency bands during the operation of a single communication link, which imposes significant challenges to typical local oscillator (LO) based transmitter solutions. This is because the switching time of the LO-based transmitter is often determined by the LO channel switching time under the control of the loop bandwidth of the frequency synthesizer, around 1 MHz. Hence, the achievable channel switching time is around several microseconds, which unfortunately is too long for an agile radio. A fully digital PWM based multi-standard transmitter, known in the art, suffers from high distortion, and the channel switching time is still determined by the LO at the carrier frequency. A DDS can be used as the LO sourced to enhance the switching speed, however, this design consumes significant power and may not deliver a high frequency LO with low spurious components. Alternately, single sideband mixers can be used to generate a number of LOs with different center frequencies using a common phase-lock loop (PLL), whose channel switching times can be fast. However, this approach can only support a limited number of LO options and any additional channels to cover the wide range of the anticipated 4G bands would need extra mixtures. As discussed, sigma-delta modulators have been proposed in the art to serve as an RF transmitter to overcome these issues. However, in the basic architecture, a sigma-delta modulator cannot provide a very high dynamic range in a wideband of operations due to a moderate clock frequency. It is precisely because the clock frequency is constrained by current technology that this high frequency mode of operations cannot be supported.

Figure 3:
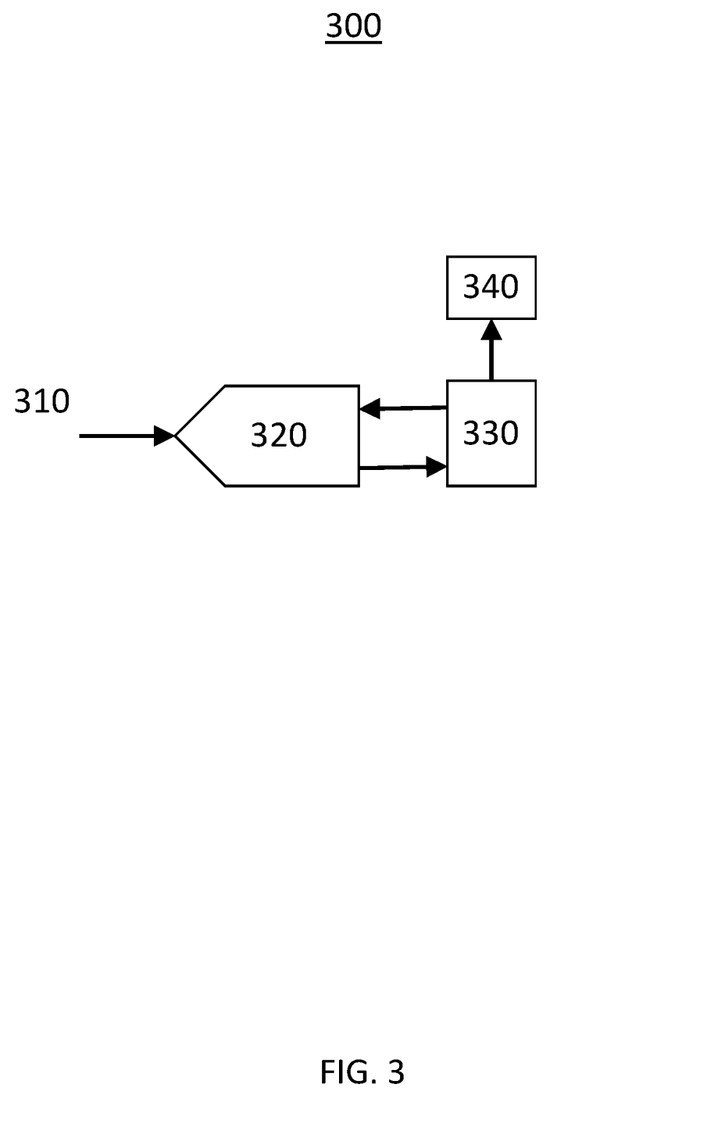
FIG. 3 shows an exemplary system for dynamic frequency correction in delta-sigma based software defined receiver.

Turning now to FIG. 3, an exemplary system for dynamic frequency correction in delta-sigma based software defined receiver 300 is shown. The system is operative to determine a signal response for a respective Doppler shift. For example, an example of a Doppler shifted signal is applied to the system front end of the receiver. The system is then operative to determine a frequency difference in the expected carrier frequency and the Doppler shifted carrier frequency. Once this difference is determined, the difference is applied as an offset to the filter response, thereby shifting the filter bandwidth by an amount equal to the offset. The system is then operative to determine in the shifted filter frequency response has an adequate attenuation and passband response. If so, the frequency offset value is stored in memory for use in normal operations. According to an exemplary embodiment, during a system configuration mode, a pilot tone 310 at a known frequency is applied to the delta sigma modulator 320. The pilot tone would is set be the frequency of an expected operating frequency plus or minus the effects of a Doppler shift. The system is then operative to perform an initial adjustment of the filter according to the known pilot frequency. The DSP 330 is then operative to generate a calibration term, such as an n-bit calibration word. The calibration term is stored in a memory 340. During normal receive mode operation, the system is further operative to amend the n-bit calibration code to the tuning code typically presented to the modulator in response to the Doppler shift. The system may be combined using a simple adder, a comparable adder, or implemented in software.

Figure 4:
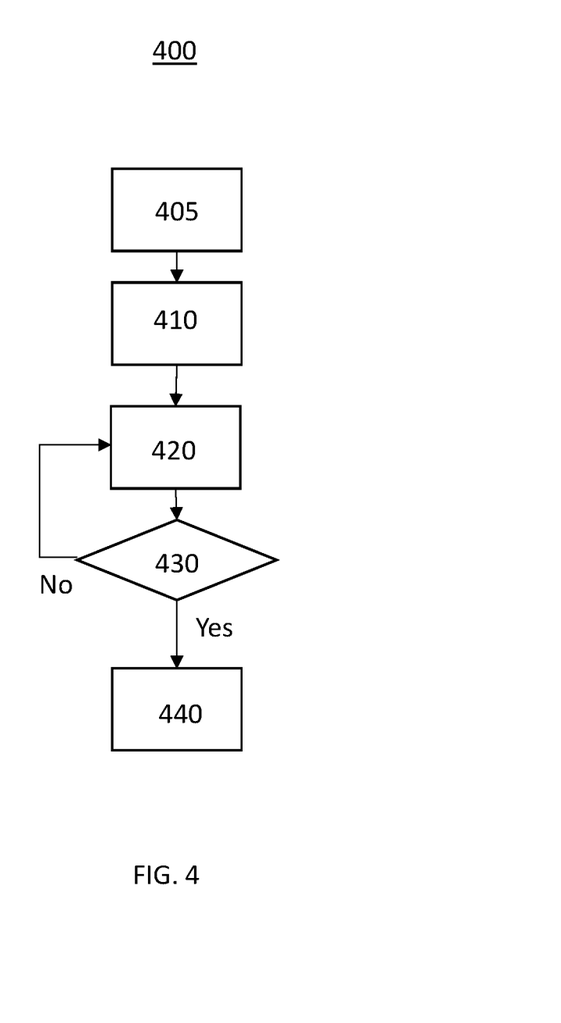
FIG. 4 shows an exemplary method for dynamic frequency correction in delta-sigma based SDR.

Turning now to FIG. 4, an exemplary method for dynamic frequency correction in delta-sigma based SDR 400 is shown. During calibration of the signal processing system, the method is operative to first configure the SDR to receive a signal at an expected carrier frequency 405. The system is then operative to apply an RF pilot signal 410 to a signal receiving portion of the receiver, such as at the antenna, or at the bandpass filters, or input to the receiver, as described previously. The RF pilot signal will have a known center frequency that is offset from the expected carrier frequency by an amount equal to an expected Doppler shift under operating conditions. The SDR configuration is then configured to process the RF pilot signal. They system is then operative to determine if the SDR configuration is suitable for receiving the RF pilot signal 430. If the frequency response of the SDR configuration is not suitable for properly processing the RF pilot signal, the SDR configuration step 420 is repeated and the SDR configuration is altered in response to the frequency response determination. If the frequency response of the SDR configuration is suitable for properly processing the RF pilot signal, the system is then operative to save the configuration data associated with the frequency of the RF pilot signal 440. For example, a frequency offset value may be stored with the center frequency of the RF pilot signal. Alternatively, delta signal modulation configuration parameters may be saved to a memory along with the frequency response of the RF pilot signal.

Figure 5:
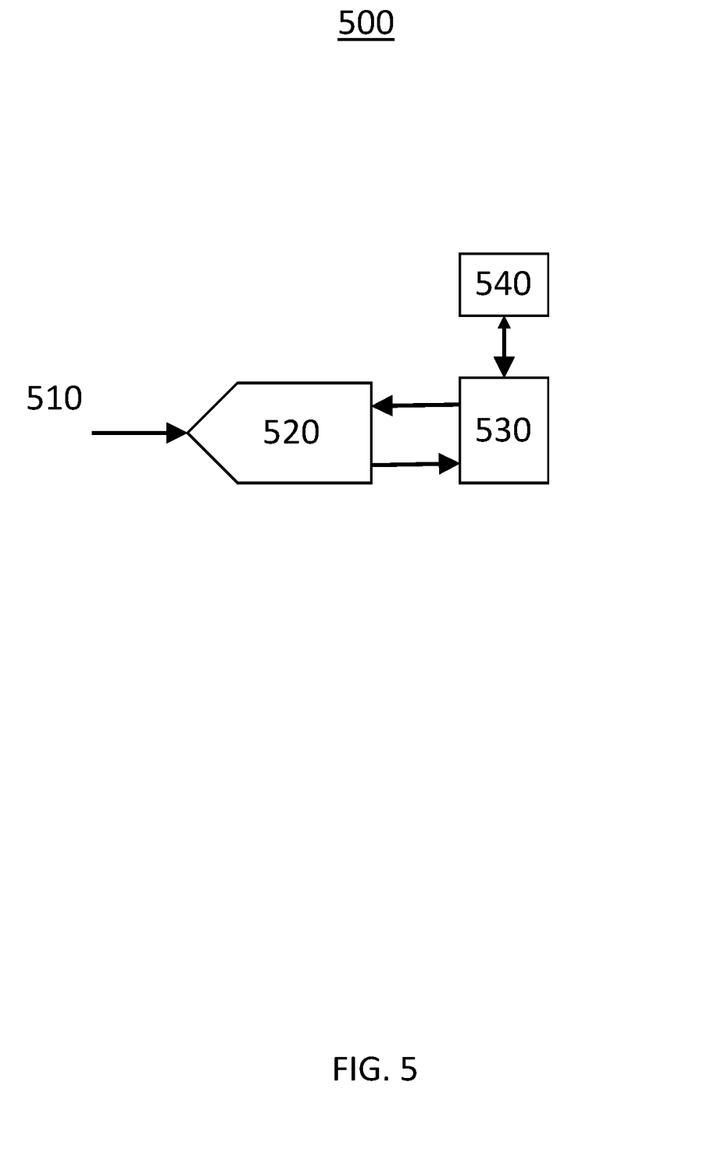
FIG. 5 shows an exemplary apparatus for dynamic frequency correction in delta-sigma based software defined receiver.

Turning now to FIG. 5, an exemplary apparatus for dynamic frequency correction in delta-sigma based software defined receiver 500 is shown. The system is operative to receive a RF signal 510. Initially the SDR 520 is configured to receive the RF signal at an expected frequency. The SDR processes the received RF signal 510 and couples the filtered and demodulated data to the DSP 530. The DSP processes the data and determines the signal quality or a quality factor of the signal. If the signal quality is below an acceptable quality threshold, the DSP attempts to determine the center frequency of the received RF signal. If the determined center frequency is different than the expected center frequency, the DSP retrieved the appropriate saved configuration parameters from the memory 540. These configuration parameters are used to alter the configuration of the SDR 520 to receive a signal at the determined center frequency of the received RF signal. The DSP 530 is then operative to process the data and determine if the signal quality is acceptable for the determined center frequency. If not, the process is repeated with different configuration parameters until the signal quality is acceptable. Once an acceptable configuration is established, the system is operative to process and decode the received RF signal with those parameters, and to periodically check the signal quality.

Figure 6:
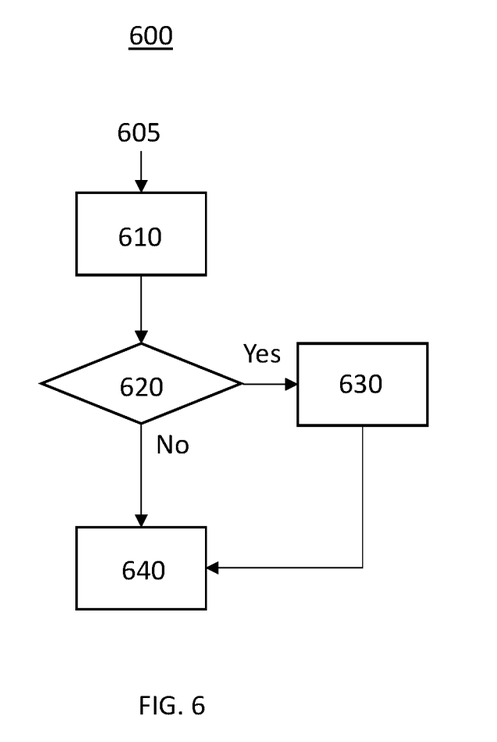
FIG. 6 shows an exemplary method for dynamic frequency correction in delta-sigma based software defined receiver.

Turning now to FIG. 6, an exemplary method for dynamic frequency correction in delta-sigma based software defined receiver 600 is shown. During signal processing operations, the method is operative to receive an RF signal 605 at the frequency band of interest. The delta sigma modulator is configured to receive the RF signal 605 at the frequency band of interest 610. A DSP is then used to determine if a Doppler shift is present on the RF signal 620, thereby changing the expected carrier frequency. If a Doppler shift is detected, a pre-stored calibration word is extracted from memory and the delta sigma modulator response is altered according to the calibration word 630. The system is then operative to process the RF signal 600. If no Doppler shift is detected, the DSP is operative to process the RF signal 600.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A software definable radio comprising:
    a source of a pilot signal operable to generate a pilot signal at a first center frequency;
    a filter having a configurable filter response in response to a configuration parameter and wherein the filter is operative to reconfigure the configurable filter response in response to a second configuration parameter;
    a processor operative to generate a control signal in order to apply the pilot signal to the filter, for determining the first center frequency and for generating the configuration parameter in response to the first center frequency, wherein the processor is further operative to determine a second center frequency, to retrieve a second configuration parameter associated with the second center frequency and to couple the second configuration parameter to the filter;
    a memory for storing the configuration parameter and the second configuration parameter; and
    a digital baseband processor for processing an RF signal having a carrier frequency corresponding to the second center frequency.

* * * * *